United States Patent [19]
Martin

[11] 3,958,682
[45] May 25, 1976

[54] COORDINATION OF ROBOT AND CONVEYOR

[76] Inventor: Paul S. Martin, 189-54 43rd Road, Flushing, N.Y. 11358

[22] Filed: June 9, 1975

[21] Appl. No.: 585,107

Related U.S. Application Data

[63] Continuation of Ser. No. 412,532, Nov. 5, 1973, abandoned.

[52] U.S. Cl. .................................. 198/19; 72/184; 83/295; 198/40; 214/1 BB; 219/125 R; 318/39; 408/32
[51] Int. Cl.² .......................................... B23Q 7/03
[58] Field of Search .................. 198/19, 40; 83/295; 72/31, 184; 214/1 PE, 1 CM, 1 BB, 1 BT; 408/32; 318/39; 219/79, 80, 124, 125 R

[56] References Cited
UNITED STATES PATENTS

| | | | |
|---|---|---|---|
| 3,026,405 | 3/1962 | Anderson | 219/124 |
| 3,283,918 | 11/1966 | Devol | 198/19 |
| 3,543,910 | 12/1970 | Devol et al. | 214/1 BB |
| 3,665,148 | 5/1972 | Yasenchak et al. | 219/125 R |
| 3,818,290 | 6/1974 | Harper et al. | 318/39 |

Primary Examiner—Evon C. Blunk
Assistant Examiner—Joseph E. Valenza

[57] ABSTRACT

An endless chain is caused to become locked to and driven by a work-carrier forming part of a conveyor. The chain drives a signal generator whose output represents the advance of the work-carrier past a robot and the generated signal is combined with program control signals of the robot to modify the operation of the robot so that the robot can operate on a moving work-piece whereas the robot's program alone would cause robot operations on a work-piece that remains at-rest.

18 Claims, 8 Drawing Figures

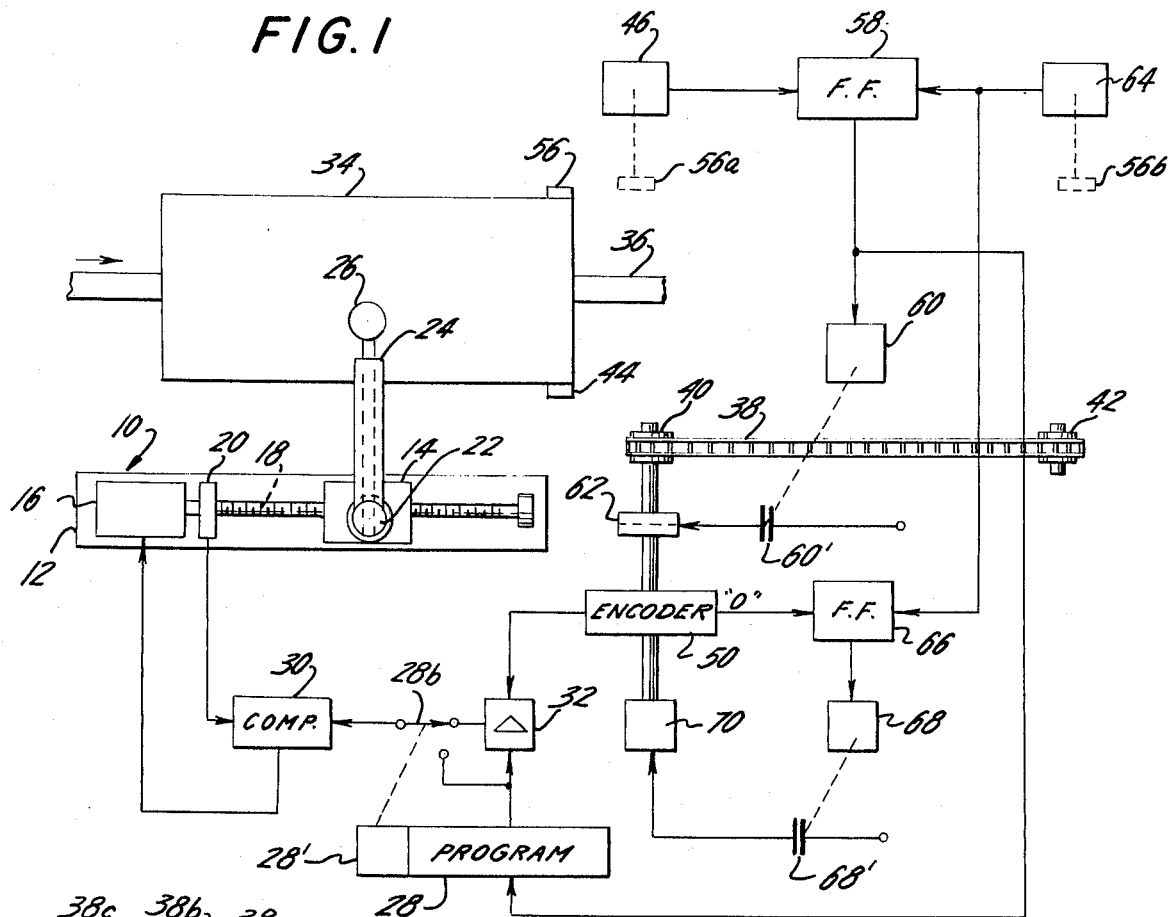
FIG.1
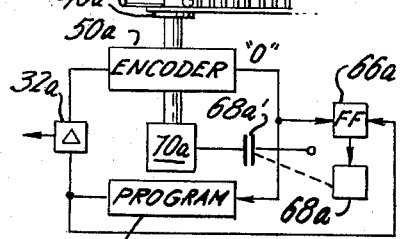
FIG.2C
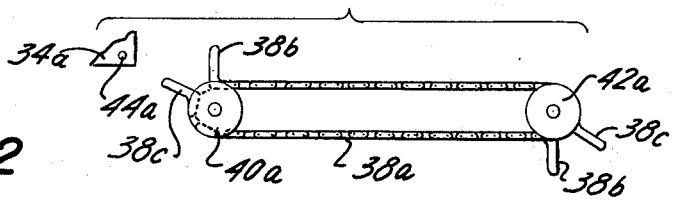
FIG.2B
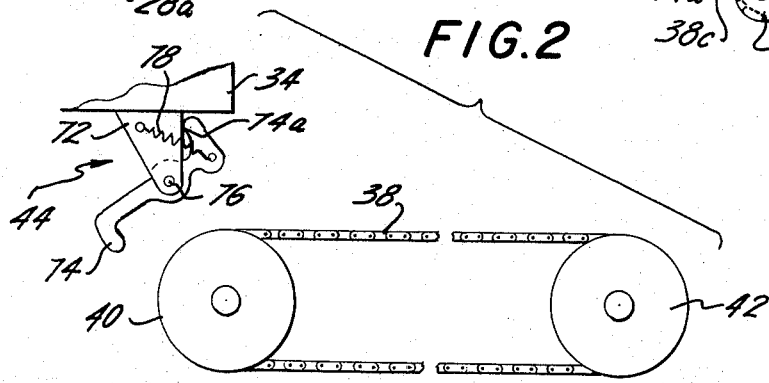
FIG.2
FIG.2A

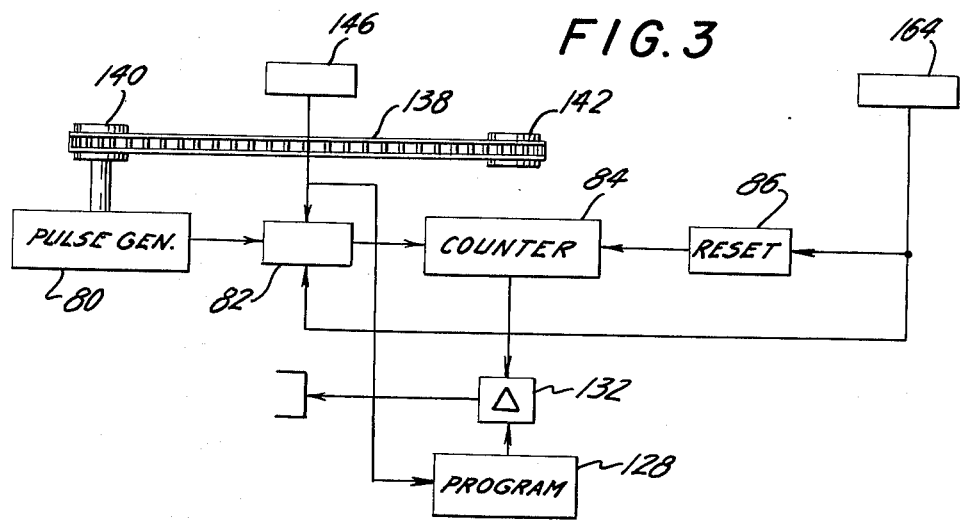
FIG. 3
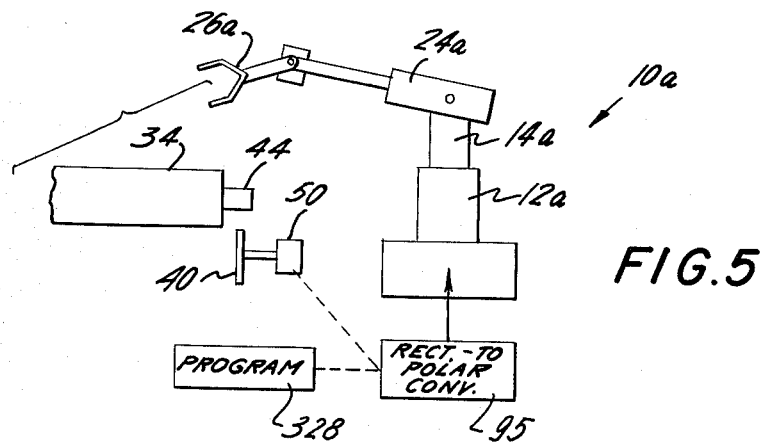
FIG. 5
FIG. 4

COORDINATION OF ROBOT AND CONVEYOR

This is a continuation of application Ser. No. 412,532, filed Nov. 5, 1973, now abandoned.

FIELD OF THE INVENTION

This invention relates to program-controlled apparatus sometimes called industrial robots, and has as a broad object the provision of novel means for modifying the operation of the robot under control of its own program which is appropriate to execute prescribed operations on a work-piece at rest. In this way the robot can execute the same operations on a work-piece carried by a work-carrier driven by a conveyor.

BACKGROUND OF THE INVENTION

It is known that an industrial robot can be coordinated with a conveyor to carry out prescribed operations on work supported on a carrier as the carrier is advanced by a conveyor. In one way this is done by transporting the robot along the path of the conveyor, as disclosed in U.S. Pat. No. 3,283,918, issued Nov. 8, 1966 to George C. Devol. It has also been shown that an industrial robot whose program is appropriate to carry out prescribed operations on a work-piece at rest can be adapted to perform the same operations on a work-piece in motion by combining the program control signals with signals generated synchronously with the conveyor, as disclosed in U.S. Pat. No. 3,543,910, issued Dec. 1, 1970 to George C. Devol et al. More recently, it is suggested in application Ser. No. 132,063, the continuation of which became U.S. Pat. No. 3,818,290, filed Apr. 7, 1971 by E. V. Harper et al. that operation of an industrial program-controlled robot can be modified by signals generated by apparatus that is locked to a work-carrier moved by a conveyor past a program-controlled robot. That apparatus is relatively massive and inherently expensive. Application Ser. No. 132063 is mentioned in U.S. Pat. No. 3,665,148 which discloses a program-controlled industrial robot or manipulator to which the present invention can be applied.

SUMMARY OF THE INVENTION

An endless chain having a length extending along the path of a conveyor-driven work-carrier is coupled to such a work-carrier in various ways to drive a compensating signal generator for modifying the operation of a program-controlled robot. The robot may, for example, be of the type that has primary operations in a rectangular system of coordinates or it may be some other type such as one which operates in a system of polar coordinates.

In one series of embodiments, any of the links of the endless chain is latched to a moving work-carrier. Thereafter, when the chain is operating at the speed of the work-carrier, a "start" detector responds to the work-carrier reaching a prescribed position to start the compensating signal generator and to start program-controlled operation of the robot. The compensating signal generator includes an encoder where an encoder is required for modifying the operation of the type of robot involved, and in that case, the encoder is reset to "zero" or a starting configuration at some time after the robot has completed its cycle of operations and before the next operating cycle. However, it is not necessary to operate the chain as part of this resetting operation. The latched coupling of the chain to the work-carrier is readily released as the work-carrier is moved beyond the chain.

An endless chain may also be used to operate a compensating signal for the robot where the chain bears specialized coupling devices for engaging a part projecting from a work-carrier, the chain then driving a compensating signal generator for modifying robot operation. In a specific embodiment, the compensating signal generator is an encoder whose zero is coordinated with the positioning of one of the specialized coupling devices of the chain at a start location. After each program cycle, both the endless chain and the encoder are driven to their next start configurations in the forward direction.

The compensating signal generator that becomes coupled to the work-carrier by either type of chain may be a pulse-generator or a sine-wave generator whose output represents incremental steps of travel of the work-carrier. This output may be supplied to an electronic encoder to modify the robot's program or the output may be combined directly with program-control signals.

ILLUSTRATIVE EMBODIMENTS

The nature of the invention in its various aspects, and its further features and advantages, are discussed in detail in the following description of several embodiments of the invention wherein the different embodiments illustrate various specific features of the invention. The description refers to the accompanying drawings which form part of the disclosure of the described embodiments. In the drawings:

FIG. 1 represents diagrammatically plan view of an illustrative industrial robot and of a conveyor-driven work-carrier, together with a novel compensating-signal generator for modifying the program-controlled operation of the robot, and including an endless chain for driving the signal generator;

FIG. 2 is a side view of the endless chain and a coupling latch for locking a work-carrier to the chain;

FIG. 2A is an enlarged detail of the chain and the latch of FIG. 2, shown in interlocked engagement;

FIG. 2B is a modification of the chain and coupling device of FIG. 2;

FIG. 2C is a diagram of a portion of FIG. 1 modified for use with the chain and coupling means of FIG. 2B;

FIGS. 3 and 4 are further modifications of a portion of FIG. 1 illustrating other compensating signal generators; and FIG. 5 is a diagrammatic illustration of compensating signal generating means as in FIGS. 1–4 inclusive, applied to a polar-coordinate type of robot.

In FIG. 1, an illustrative program-controlled apparatus 10 includes stationary or main base 12. Reversible drive motor 16 rotates screw 18 for operating secondary base 14 along base 12 on suitable rails (not shown). Encoder 20 operated by screw 18 provides output which at all times represents the position of secondary base 14 along the main base. Encoder 20 may be of any appropriate type, depending on the type of control used. For purposes of illustration and also because of its unique advantages, encoder 20 in this embodiment is the well known type involving a cyclic binary encoder with as many contacts, photo-electric cells or other sensors as there are bits in the code. The encoder is operable through somewhat less than one code cycle as secondary base 14 traverses base 12 from end to end.

Secondary base 14 has a post 22 that is operable vertically and has a drive means and an encoder like that of secondary base 14. Correspondingly, arm 24 extends horizontally from vertical post 22 and is equipped with like operating means and an encoder. Work head 26 carried by arm 24 may be a spray gun for paint or other fluid, or a drill or other machine tool, or a wrench. It may be an article gripper for seizing an article at one location and transporting it to another, and the gripper may have rotary drive means for driving a screw or a nut. It may be a pair of resistance welding jaws, and so forth. Moreover, head 26 normally includes additional secondary program-controlled mechanisms bearing the actual tools or other work devices to be manipulated.

In well-known manner, successive motions are executed under control of output from a stored memory of digital coordinates in this apparatus, plus appropriate stored controls to execute functions as for closing and opening jaws of an article gripper/or a welder, etc. Successive digital codes are provided here by "program" unit 28, for all of the controlled drives of the robot. Comparator 30 receives digital codes from a portion of program unit 28 via combiner 32, described below. Motor 16 operates screw 18 to transport secondary base 14 to a position along bed 12 where the code of encoder 20 matches the input to comparator 30. Thereafter a new code is presented by program unit 28, for operation of the secondary base 14 to another location along bed 12, as part of a continuing program of operations.

The program is recorded by operating the apparatus under manual control to perform a desired sequence of operations on a work piece supported on carrier 34 that is stationary at this time. This carrier is part of a conveying system, moved along a path from one work location to another by suitable power means here represented by drive cable or chain 36. The speed may be uniform, but it might be irregular or even interrupted at times. The apparatus of FIG. 1 adapts the program-controlled apparatus to execute the recorded sequence of operations on a traveling work piece in a manner that duplicates the operations recorded with carrier 34, at-rest. One form of apparatus for that purpose as shown in FIG. 1 includes a simple chain 38 such as a bicycle chain on freely rotatable sprockets 40 and 42. The upper length of the chain is adjacent to the path of work carrier 34 and parallel thereto, and guide means (not shown) avoids sag of the chain between the sprockets. A chain coupling device 44 on work carrier 34 becomes latched to chain 38 at a point in the powered advance of carrier 34 (toward the right in this figure) after which chain 30 and sprocket 40 maintain precise coordination with carrier 34 as to speed and position. After this coordination has been established, a sensor or start detector 46 responds to a control element 48 on carrier 34 to start the program of apparatus 10 and to start operation of compensating encoder 50. Of course detector 46 could start program unit 28 of unit 10 which would then start operation of the compensating encoder. As shown, the start detector is arranged to initiate both of these operations.

Detector 46 is a limit switch, for example, or a photocell that responds to a beam of light reflected by an index mark 56 on carrier 34. This index mark may be a retroreflector such as a spot of tiny glass beads or a cluster of tiny reflecting corner cubes. The effect of a signal from detector 46 is to "open" flip-flop 58 when the index mark reaches position 56a. This energizes relay 60 whose normally open contacts 60' close, thereby engaging a clutch 62 such as a magnetic clutch. In this way, work carrier 34 becomes coupled to encoder 50. The design of this encoder is advantageously such as to generate a numerical sequence of binary cyclic codes that do not repeat during all of the time chain 38 is driven by work-carrier 34. The design of the encoder is also such as to be reset to zero by being driven forward, in the preferred embodiment.

After the program of robot 10 has been completed, carrier 34 advances to the point where index mark 56 reaches position 56b opposite "stop" detector 64. A signal from stop detector 64 reverses the condition of flip-flop 58 and deenergizes relay 60 and clutch 62, thereby de-coupling the encoder 50 from sprocket 40.

Stop detector 64 additionally reverses the condition of flip-flop 66, energizing relay 68 and closing its normally open contacts 68' to cause operation of motor 70. This motor operates encoder 50 in the forward direction toward its 0-position where the encoder cycle is nearly completed when relay 68 is energized. This makes the reset operation fast and minimizes wear. The motor could, of course, be arranged to operate the encoder reversely to "0." When encoder 50 reaches 0, a signal to flip-flop 66 reverses the condition of the flip-flop, and reset motor 70 is energized. Well-known arrangements (not shown) may be used, if needed, to brake motor 70 and, if necessary, to slow motor 70 as 0 approaches.

The stop detector 64, flip-flop 66, relay 70 and motor 70 may be omitted where the encoder is proportioned in relation to the chain drive so that the cycle of the encoder is completed before the carrier 34 becomes disengaged from the chain and where the program cycle of the robot is also completed earlier. In that case, the 0-output of the encoder is connected to reset flip-flop 58, disengaging clutch 62 when the encoder reaches zero. The illustrated arrangement is advantageous in that it affords greater flexibility of design.

An effective form of chain coupling device 44 is shown in FIG. 2. Projecting downward from one side of work-carrier 34 is a bracket 72 bearing hook 74 on a horizontal pivot 76. The hook 74 is biased downward by tension spring 78. Downward movement of the latch is limited by engagement of stop portion 74a with bracket 72.

When carrier 34 brings hook or latch 74 to sprocket 40 and chain 38, latch 74 is lifted by chain 38 and sprocket 40, advancing without effect because the spaces in the chain are occupied by sprocket teeth. After passing sprocket 40, the end of the latch or hook 74 drops into one of the gaps between successive rollers 38' of chain 38, left open by the departed sprocket teeth. Thereafter hook 74 becomes locked to chain 38, driving the chain and rotating sprockets 40 and 42. Pivot 76 can be spring-loaded if necessary to absorb any initial jolt, but where carrier 34 is operated at low speed and the mass of the chain and sprockets are small, any such jolt is inconsequential. The end of hook 74 that enters the space is tapered so as to become releasably wedged between rollers 38'. By like token, latch 74 may have a tapered notch at its end to embrace a roller 38'. Any fore-and-aft jerking of work carrier 34 that might occur would cause corresponding fore-and-aft operation of chain 38 and encoder 50.

Encoder 50 is not coupled to chain 38 or sprocket 40 at this time. After chain 38 is locked to work carrier 34 so that both move at the same speed, start detector 46 causes clutch 62 to become engaged as described above.

The speed of carrier 34 may be variable, or it may be erratic, or at times it may even stop or reverse momentarily in a jerk. As seen in FIG. 2A, hook 74 is shaped to become wedged between successive rollers 79 of the chain. This ensures forward and reverse drive of the chain by carrier 34. When carrier 34 has completed its travel along chain 38, hook 74 is lifted out of engagement with the chain by the teeth of sprocket 42.

As stated above, the ordinary operation of the program-controlled apparatus as recorded with the work carrier at rest is to be modified so that each coordinate of the program along base or bed 12 is modified by adding the displacement of the work piece out of its at-rest position. This is the position of the work when spot 56 is sensed by detector 46. In an example, encoder 50 and program unit 28 produce digital codes, as in cyclic gray code, and the digital values from encoder 50 are added to the values from program unit 28 by combining unit 32, to add or subtract as required. Head 26 then executes the same program in relation to work on a moving carrier that the program-controlled equipment would execute with the work piece at rest.

At times (as in an assembling operation) a step in the recorded program may require head 26 to be moved to a stationary location off carrier 34. This may be accomplished by a "function" program section 28a that operates switch 28b to switch comparison unit 30 away from combining unit 32 (as shown) and to receive direct input from program signal source 28.

FIGS. 2B and 2C represent a modification of a portion of the apparatus of FIGS. 1 and 2. A rod 44a projects horizontally from a side of carrier 34a. Chain 38a has two upstanding arms 38b at points spaced apart half-way along the chain. At rest, one arm 38b is disposed above sprocket 40a. A companion arm 38c on chain 38a is spaced by a large angle from arm 38b by virtue of its displacement around sprocket 40a. When rod 44a is transported by carrier 34a against arm 38b, the chain starts to move with the work carrier. Arm 38c then quickly swings toward arm 38c, so that rod 44a is gripped between a pair of arms 38b and 38c. This form of coupling from the carrier to the chain accommodates a latitude of variation in the relative positions of the chain and the work carriers, vertically by virtue of the length of arms 38b and horizontally by virtue of the length of rod 44a. One of the arms 38b or 38c may be resilient and may clamp rod 44a resiliently yet firmly against the companion arm.

The coordinating apparatus of FIG. 1 is modified for use with chain 38a as shown in FIG. 2C. Chain 38a is to be advanced to the starting position illustrated after rod 44a of a departing carrier 34a has passed beyond sprocket 42a. This is achieved by motor 70 when operated for resetting the encoder to 0. In the modified apparatus, relay 60 and clutch 62 are omitted. Sprocket 40a drives encoder 50a directly. When a rod 44a shifts an arm 38b to start driving the chain in coordination with carrier 34, encoder 50a moves out of its 0 position, thus providing an impulse for starting the program of robot 10. The same starting impulse causes program control 38a to reverse the condition of flip-flop 66a, to close contacts 68a' of relay 68a and thereby to energize small motor 70a. The vastly greater driving force of the work carrier overpowers motor 70a, so that the advance of chain 38a is not affected by motor 70a at first. Later, arm 38b swings around the right-hand sprocket (not shown in FIG. 2C), freeing the projecting rod 44a from the chain. Thereafter motor 70a drives encoder 50a, sprocket 40a and chain 38a until encoder 50a advances once again to 0. Flip-flop 66a reverses once again, deenergizing relay 68a and stopping motor 70a.

Another modification of portions of the embodiment of FIGS. 1 and 2 is shown in FIG. 3. Description of identical parts is not repeated here, and the work-piece carrier, the program-controller apparatus, and encoder chain coupling hook 74 are omitted entirely from FIG. 3. Of course those components form part of the complete embodiment of FIG. 3. Chain 138 and sprocket 140 correspond to chain 38 and 40. Program code supplying unit 128, combining unit 132 and detectors 146 and 164, corresponds to like parts 28, 32, 46 and 64 of FIG. 1, respectively. There is no need to repeat their description or operation.

After a carrier 34 is coupled to chain 138, sprocket 140 operates a pulse generator 80 that emits one pulse for each significant incremental degree of rotation of the sprocket. A start pulse from detector 146 starts the program of the robot 10 (represented by the link of detector 146 to program unit 128) and at the same time gate 82 closes to transmit generated pulses to electronic counter 84. This counter developes the same numerically sequential digital codes as those of encoder 50. These are combined in unit 132 with the component in the output of program unit 128 which controls motor 16 (FIG. 1). Detector 164 provides a stop signal to reset pulse unit 86, for resetting counter 84 to zero. The embodiment of FIG. 3 is simpler and relatively inexpensive, but stray pulses sometimes upset apparatus of this kind which depends on pulse counting. Moreover, reverse movements of carrier 34, as in jerks, could cause faulty operation. The embodiment of FIG. 1 is more immune to such effects and is preferred under such conditions.

The embodiment of FIG. 3 provides an encoder in the form of a counter that represents the displacement of the work-carrier from a starting position opposite the robot. Such an encoder is needed in various circumstances. However, it may well be integrated into the program control apparatus of the robot, and in that case, there might be no need for a discrete counter 84. For example, where the robot involved is one having a straight-line motion along the conveyor, as one coordinate of motion (such as that executed by motor 16 and screw 18 as part of a digital servo) the output pulses of generator 80 could be added directly to the output of the digital program control for that coordinate of motion of the robot. Moreover, where the robot uses resolvers rather than (or as part of) a digital control system, generator 80 may take the form of a sine-wave signal generator.

The embodiments of FIGS. 1 and 2c involve an electromechanical encoder that is reset preparatory to each new cycle of program-controlled operation of apparatus 10 in relation to each newly advancing work-carrier. The embodiment of FIG. 4 involves a mechanically operated numerical combination-code generator like that of FIG. 1, but no reset motor such as motor 70 is needed in FIG. 4. Numbers in the "200" series are used in FIG. 4 to represent like parts found in FIG. 1. Description of those parts and their operation is omitted as unnecessary.

Encoder 250 provides an input numerical code to "running" electronic register 89 each time a new code is formed. This running register is a convenience, and may be considered to be part of encoder 250. That code is stored in register 90 as soon as a start pulse from detector 246 opens gate 91 momentarily. The position of the work carrier after the start pulse is represented by the difference between the numerical values in registers 89 and 90. This is derived by subtraction, in "difference" unit 92. Its output is supplied to combining unit 232 which modifies the control digital codes from program control unit 228. A refinement here is in the provision of a "carry-one" unit 93. It may be imagined that the code entered into both registers 89 and 90 in response to a start pulse is 80,000 and that the total capacity of the encoder is 100,000. (Actually, binary codes are usually used, but decimal numerals will perhaps serve better for explanation.) Not long after the start pulse, the count in encoder 250 and in register 89 will reach 99,999 and return to zero, to start ascending again. A bistable additional counter stage 93 provides a 1 as the 00,000 of register 89 is reached, and enables the subtraction process to continue. At the start of each new program of operations, when registers 89 and 90 assume the reading of encoder 250, the 1 stored in unit 93 is reset to 0 by a pulse from detector 264.

The concepts above have been illustrated and described in connection with what amounts to a rectangular-coordinate robot 10. A robot which operates according to a polar (or other) system of coordinates can be adapted to utilize the foregoing features. For example, robot 10a in FIG. 5 is essentially a polar-coordinate robot having a post 14a that rotates about a vertical axis in base 12a, and arm 24a pivots on post 14a and becomes elongated when work head 26a is to be extruded, all under program control. Program unit 328 has a system of rectangular-coordinate controls, one of which is combined with the output of encoder 50, and this combined value is then converted with control values for other coordinates into polar-coordinate control functions, by means of converter 95, to control the servos of robot 10 which are digital servos for example. Unit 95 may be electromechanical as shown in the above-mentioned U.S. Pat. No. 3,543,910, or it may be a digital computer specifically designed or specially programmed to effect this conversion.

Many changes in matters of detail and substitutions of equivalents will readily occur to those skilled in the art in applying the foregoing. For example, if it were practical to derive a reset signal from the program control unit of the robot at the end of the program cycle, such a reset signal could be used instead of relying on a stop detector 64, 164 and 264 as in FIGS. 1, 3 and 4. Where the reflecting spot 56 is shown applied to the work carrier, it could correspondingly be applied to the work-piece on the carrier; or the work could be arranged to break a beam instead of using a reflecting element. These and other variations are contemplated and consequently the invention should be construed broadly in accordance with its full spirit and scope.

What is claimed is:

1. In combination, an industrial robot having a work head operable through a range of positions and having control means programmed for causing the work head to perform an automatic program of operations and three-dimensional motions relative to a work-piece at rest, a conveyor including a work carrier for transporting the work-piece along a path in the operative range of the work head, the work-piece and its work carrier forming a work unit, and means for modifying the control of the work head by the programmed control means in accordance with the travel of the work unit, said modifying means including means for providing corrective output having a starting condition, and means for operating said corrective output means out of said starting condition in synchronism with the travel of the work unit, said operating means including an endless chain, means for supporting said chain and for disposing a length thereof for movement along a chain-advance path adjacent and parallel to said path of the work carrier, said chain-supporting means including at least one sprocket and said chain being operable endlessly in one direction about said sprocket, transmission means for providing drive of said corrective output means by said sprocket, locking means for coupling said chain to said work unit to be driven thereby and for operating said corrective output means throughout the automatic program of the work head and for thereafter releasing the chain from the work unit, and means for restoring said corrective output means to its starting condition after completion of said automatic program while said chain is operated at any rate including zero in said one direction.

2. The combination in accordance with claim 1, wherein said coupling means includes a latch carried by said work carrier along said chain-advance path, the latch being complementary to and operable into locked engagement with any of numerous discrete portions of the chain, and means biasing said latch toward said engagement.

3. The combination in accordance with claim 1, wherein said transmission means includes means for decoupling said corrective output means from said sprocket during operation of said restoring means.

4. The combination in accordance with claim 1, wherein said chain supporting means includes an additional sprocket, said sprockets including first and second sprockets arranged to support said length of chain at the start and at the end of the chain-advance path, respectively, the sprockets having teeth that enter spaces in the chain, and wherein said releasable means comprises a latch carried by a work carrier along said chain-advance path and biased toward the chain and complementary to and operable into locked engagement with numerous discrete portions of said chain, said latch being adapted to enter the sprocket-tooth spaces of the chain, the teeth of said second sprocket being effective to push the latch out of locked engagement with said chain as said work carrier carries said latch past said second sprocket.

5. The combination in accordance with claim 4, wherein said corrective output means comprises encoding means, wherein said transmission between said sprocket and said corrective output means includes a clutch, and wherein said apparatus further includes a start control responsive to the work unit reaching a prescribed position for causing the clutch to couple said sprocket to said corrective output means.

6. The combination in accordance with claim 1, wherein said corrective output means is of a type wherein continued operation in one direction causes restoration thereof to said starting condition, and including means operable after release of said chain from the work unit for advancing said chain in said one direction until said corrective output means is restored.

7. The combination in accordance with claim 1, wherein said transmission provides continued coupling of said sprocket and said corrective output means during operation of said control modifying means and during operation of said restoring means.

8. The combination in accordance with claim 1, wherein said corrective output means includes an impulse counter and impulse means operable by said transmission means for supplying impulses to the counter, and wherein said restoring means is arranged to restore said counter to its starting condition, whereby restoration of the corrective output means to its starting condition is independent of the chain.

9. The combination in accordance with claim 1, wherein said corrective output means includes a digital encoder operable by said transmission means, a storage register, and means for deriving the difference between the output of the encoder and that of the storage register for thereby providing the desired corrective output, said restoring means including means responsive to arrival of the work unit at a prescribed position for entering the output of the encoder into the storage register for thereby establishing said starting condition, whereby restoration of the corrective output means to its starting condition is independent of the chain.

10. The combination in accordance with claim 1, wherein said coupling means includes discrete devices on said work carrier and on said chain cooperable to form a drive coupling, and wherein said corrective output means comprises an encoder operated by said transmission means, and wherein said control modifying means further includes drive means for resetting the encoder to zero following completion of the automatic program of the robot and for concurrently advancing a said discrete device on the chain into starting position.

11. The combination in accordance with claim 1, wherein said corrective output means comprises an electromechanical digital encoder, and wherein said transmission means includes a clutch between said sprocket and said encoder, and wherein said restoring means includes drive means for resetting the encoder to zero, further including control means for activating said encoder-resetting drive means following completion of the program-controlled operation of the robot on the work carried by the work carrier, said control means causing disengagement of the clutch during resetting of the encoder.

12. The combination in accordance with claim 1, wherein said coupling means includes driving and driven devices of the article carrier and the endless chain, respectively, the devices of said coupling means being cooperable in interlocked relationship and the device carried by the chain being disposed in the path of advance of the driving device of the work carrier for establishing said interlocked relationship and for thereby operating said corrective output means.

13. The combination in accordance with claim 1, wherein said coupling means comprises latching means carried by a work carrier and operable to engage and become locked to any of numerous portions of the chain distributed along the length thereof, and wherein said corrective output means comprises a digital encoder, said apparatus further including a start control responsive to the arrival of the work unit at a position along said path following establishment of locking engagement of said latch to said chain for concurrently initiating operation of the programmed control means of the robot and for initiating the advance of said encoder.

14. The combination in accordance with claim 1, wherein part of the coupling means is carried by the work carrier and includes a pivoted latch biased toward the chain for cooperation with any of numerous portions thereof distributed along the length thereof and effective, when in coupled relationship to the chain, to enforce fore-and-aft motion of the chain in the event of fore-and-aft jerking of the article carrier.

15. In combination, an industrial robot having a work head operable through a range of positions and having control means programmed for causing the work head to perform an automatic program of operations and three-dimensional motions relative to a work-piece at rest, a conveyor including a work carrier for transporting the work-piece along a path in the operative range of the work head, the work-piece and its work carrier forming a work unit, and means for modifying the control of the work head by the programmed control means in accordance with the travel of the work unit, said modifying means including means for providing corrective output having a starting condition, and means for operating said corrective output means out of said starting condition in synchronism with the travel of the work unit, drive means for said corrective output means, locking drive coupling means for initiating, maintaining and terminating coupling of said drive means to said work unit for operation in synchronism therewith during travel of the work unit along said path, and means operative after coupling of said drive means to said work carrier has been established for initiating the automatic program of the robot and for rendering said control modifying means effective to modify the automatic operations of the robot pursuant to its programmed control means.

16. The combination in accordance with claim 15, wherein said corrective output means includes an electromechanical digital encoder continuously coupled to said sprocket by said transmission means, a storage register, and means responsive to said register and said encoder for deriving values representing the advance of the encoder, and said restoring means including start control means responsive to the arrival of the work unit at a starting position for entering into the storage register the value represented by the encoder at that time.

17. The combination in accordance with claim 15, wherein said corrective control output means includes an electromechanical encoder, and wherein said drive means includes clutch means activated by said means responsive to the arrival of the work unit at a start position for initiating operation of the encoder, and wherein said restoring means includes reset means for said encoder, and further including control means for said clutch and said reset means operative after the robot has completed its program for discontinuing operation of the encoder by the drive means and for causing reset of the encoder by the reset means.

18. The combination in accordance with claim 15, wherein said corrective output means includes a pulse generator operated by said drive means and a counter rendered responsive to said pulse generator by said means responsive to the arrival of the work unit at the start position.

* * * * *